(12) United States Patent
Hiraguchi (10) Patent No.: US 6,926,220 B2
(45) Date of Patent: Aug. 9, 2005

(54) RECORDING TAPE CARTRIDGE

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 196 days.

(21) Appl. No.: 10/322,649

(22) Filed: Dec. 19, 2002

(65) Prior Publication Data

US 2003/0122015 A1 Jul. 3, 2003

(30) Foreign Application Priority Data

Dec. 28, 2001 (JP) .................................. 2001-399741

(51) Int. Cl.$^7$ .......................................... G11B 23/107
(52) U.S. Cl. ............................ 242/348.2; 242/332.4; 242/332.8; 360/132
(58) Field of Search ........................ 242/332.4, 332.8, 242/348.2, 532.6, 587.1, 587.2, 584, 584.1, 348; 360/132

(56) References Cited

U.S. PATENT DOCUMENTS

| | | | | |
|---|---|---|---|---|
| 3,620,893 A | * | 11/1971 | Tarrson .................... 428/136 |
| 4,555,077 A | * | 11/1985 | Platter et al. ............ 242/338.1 |
| 5,251,090 A | * | 10/1993 | Cheatham et al. .......... 360/132 |
| 5,803,389 A | * | 9/1998 | Gonzales et al. ......... 242/348.1 |
| 5,845,860 A | * | 12/1998 | Tohjo et al. ................ 242/348 |
| 6,095,445 A | | 8/2000 | Hentrich |
| 6,332,584 B1 | * | 12/2001 | Bakeman, Jr. ............. 242/348 |
| 6,439,489 B1 | * | 8/2002 | Hoge ...................... 242/332.4 |
| 6,505,788 B1 | * | 1/2003 | Taki et al. ............... 242/348.2 |
| 6,588,694 B1 | * | 7/2003 | Wilkerson ............... 242/332.4 |

* cited by examiner

*Primary Examiner*—Kathy Matecki
*Assistant Examiner*—Evan Langdon
(74) *Attorney, Agent, or Firm*—Sughrue Mion, PLLC (57) ABSTRACT

This invention is aimed to provide a recording tape cartridge with a smaller bump formed on a wind-up surface of a reel-hub in a tape drive while winding the recording tape on the reel hub.

The recording tape cartridge of this invention comprises a case; a recording tape, which is wound around a single rotatable reel contained in the case and wound onto a reel hub of a tape drive, for recording information thereto or playing information back therefrom; a leader tape having a tape shaped form and having a flexibility in its thickness direction, and being connected at one end of said leader tape to the top end of the recording tape; wherein said leader tape having engagements attachable to the reel hub formed at the other leader tape end which is not connected to the recording tape, and having said engagements positioned on the outer edges of the leader tape, and fitting closely on the periphery of the reel hub with the engagements engaging with the reel hub when the recording tape is wound onto the reel hub.

23 Claims, 11 Drawing Sheets

RECORDING TAPE CARTRIDGE

BACKGROUND OF THE INVENTION

1. Field of the Invention

The present invention relates to a recording tape cartridge, which contains a single rotatable reel around which a recording tape such as a magnetic tape is wound and when used, winds the recording tape onto the reel.

2. Description of the Related Art

A recording tape such as a magnetic tape is commonly employed as an external recording medium for devices such as a computer. A recording tape is contained in a recording tape cartridge. A recording tape cartridge typically has a recording tape with a leader member attached at the leading end portion of the tape, a reel around which the recording tape is wound, and a case housing the reel rotatably. Thus structured, little space is required when storing and in that space, a magnetic tape cartridge is able to record a large amount of information.

In order to record information to the recording tape cartridge, and to play back recorded information therefrom, the recording tape cartridge is loaded into a tape drive. When the recording tape cartridge is loaded into the tape drive, a take-up device of the tape drive takes up a leader member and takes guides it to the wind-up reel of the tape drive. When the leader member is guided to the reel, the recording tape is wound from the cartridge to the reel. Simultaneously, a read-write head preset along the tape path records information to (or plays it back from) the recording tape. Examples of common leader blocks include block-shaped leader blocks, small cylindrical leader pins, and tape-shaped leader tapes having a thickness greater than that of the recording tape.

The recording tape cartridge possesses a leader block that acts as a leader member. When the recording tape cartridge is used, the tape drive, which serves to secure the recording tape cartridge, unwinds the leader block and subsequently winds and secures said leader block to a reel hub. When the leader block is secured to the reel hub, the curved end of the leader block conforms to the shape of the outer periphery of the reel hub and forms the winding surface of the recording tape cartridge in the tape drive.

The smoothness of the wind-up surface of the reel hub of the tape drive depends on the dimensional accuracy of the leader block. However, because the leader block is attached to the recording tape cartridge, its dimensional accuracy differs from cartridge to cartridge and, as such, the tape drive is sometimes unable to compensate completely for the dimensional inaccuracy of the leader block. The size of the gap, which forms between the edge of the opening for securing the leader block and the surface of the leader block, also differs from cartridge to cartridge. This gap can result in a large bump on the wind-up surface.

This bump on the wind-up surface can also form creases or other deformations on a recording tape. Creases and deformations can also be formed on the second and upper layers of the recording tape including the recording areas. Running creased or deformed parts of the recording tape by the read-write head leads to deviation in the correct distance between the read-write head and the recording tape. These deviations can lead to the formation of unrecorded areas and loss of recorded information.

Additionally, it is necessary to widen the width of the entrance of the reel hub's storage section, which stores the leader block. For example, in a reel hub with a diameter of 50 mm, if the recording tape has a width of 12.7 mm then the opening in the outer section needs to be approximately 12 mm. If the dimensions of the leader block differ, then the height of the bump can differ greatly and the possibility of the aforementioned problems occurring increases greatly.

When utilizing a recording tape cartridge equipped with a leader pin as a leader member, the tape drive, which possesses an unwinding device, takes up the leader pin with its unwinding leader block. In the aforementioned tape drive, the take-up leader block hooks the leader pin and pulls it, thus winding up the recording tape. Then, the take-up leader block and the leader pin engage each other and are secured inside the reel hub of the wind-up reel. Thus, the curved end surface of the take-up leader block and the periphery of the reel hub form a wind-up surface on the reel hub. Accordingly, the bump formed on the surface of the wind-up surface is not influenced by changes in the dimension of the leader pin.

However, the position of the leader block is not usually configured to come into contact with the reel hub. Instead, it is configured so as to be movable inside of the reel hub when secured thereto, so as not to inhibit the movement of the cam mechanism of the take-up device, and further, to allow movement within the reel hub so that a pin can disengage from a through hole. The take-up leader block moves along a predetermined tape path, which is often a complicated path, by a plurality of cam mechanisms and arm mechanisms. Due to the complexity of the paths, an accumulation of mechanical inaccuracy of the various mechanisms can cause inaccurate positioning of the leader block inside the reel hub.

The inaccurate positioning of the take-up leader block can also lead to the formation of a gap on the wind-up surface of the reel hub, formed at the edge of the opening for securing the take-up leader and at the end surface of the take-up leader block. This gap causes the formation of creases and deformations on the recording tape.

On the other hand, when loading a recording tape cartridge equipped with a leader tape to a tape drive, a take-up leader fixed at one end to the reel hub picks up the leader tape at the other end of the recording tape. The leader tape and the recording tape of the cartridge are then wound onto the reel hub. Thus, the recording tape is wound over both the take-up leader and the leader tape onto the reel hub, and bumps on the reel hub surface do not create creases or deformations on the recording tape.

However, both the leader tape and the take-up leader have a greater thickness than the recording tape. In addition, the wind-up tape takes up the leader tape with the other end of the take-up leader inserted into a fixed opening of the leader tape, and then, both are taken up with the ends of each overlapped. While the overlapped portion does form a gap which can create a crease and a deformation, specific measurements can be taken and procedures implemented as needed to avoid the formation of a crease and deformation, for example, making the leader tape longer so it is able to wrap around the reel hub in several turns.

SUMMARY OF THE INVENTION

The object of this invention is to solve the aforementioned problem, or in other words, to provide a recording tape cartridge that can reduce the amount of a bump formed on a wind-up surface of a reel-hub accommodated in a tape drive when winding-up a recording tape of the recording tape cartridge onto the reel hub.

A first aspect of this invention for achieving the above object is a recording tape cartridge comprising a case; a recording tape, which is wound around a single rotatable reel contained in the case and wound onto a reel hub of a tape drive, for recording information thereto or playing information back therefrom; a leader tape having a tape shaped form and having a flexibility in its thickness direction, and being connected at one end of said leader tape to the top end of the recording tape; wherein said leader tape having engagements attachable to the reel hub formed at the other leader tape end which is not connected to the recording tape, and having said engagements positioned on the outer edges of the leader tape, and fitting closely on the periphery of the reel hub with the engagements engaging with the reel hub when the recording tape is wound onto the reel hub.

When loading a recording tape cartridge of the first aspect to a tape drive, the leader tape is drawn out of the case and the engagement on the leader tape engages with a reel hub of the tape drive.

Then, a wind-up reel of the tape drive is rotated and the leader tape will contact to the periphery of the reel hub while warping in its thickness direction to form a wind-up surface. When a recording tape cartridge has a leader tape having a length smaller than the circumference of the reel hub, the leader tape will contact closely to the reel hub in the whole of its length. Then, the recording tape is drawn out of the case and reeled on a wind-up surface formed on the reel hub. Information is recorded on the recording tape drawn out of the case by a read-write head arranged beside a specific tape path.

Since the thickness of the leader tape can be precisely controlled, its thickness irregularity is quite small. Additionally, the leader tape is fixed to the periphery of the reel hub with warping in its thickness direction. Therefore, even when a different recording tape cartridge is loaded to the same tape drive, the leader tape warps in the same curvature and can be positioned on the reel hub accurately.

In addition, since the engagement of the leader tape engages to the reel hub, there is no necessity of overlapping an end of the leader tape with an end of a take-up leader of a tape drive. Therefore, neither opening nor a protrusion for engagement needs to be formed on a central portion of the leader tape that the recording tape is wound around. As long as the engagement is located outside of the edge of the recording tape, there is no limitation of the position thereof. When the leader tape is formed wider than the recording tape, the engagement can be formed inside of the edge of the leader tape.

Since the leading tape engages at its engagement with the wind-up reel, no bump having larger height than the thickness of the leader tape is formed on the wind-up surface. Therefore, by reducing the thickness of the leader tape or providing a thickness compensation structure on the leader tape, the gap height can be reduced.

As mentioned in the above, the recording tape cartridge of the first aspect is preferable in that the height of a bump on the wind-up surface of the reel hub accommodated in a tape drive can be reduced.

Additionally, by employing a tape drive having a reel hub with a recess in a circular direction on its periphery and a leader tape having the same length and width as the recess, the leader tape fits in the recess and overlaps closely with the bottom surface of the reel hub, i.e., its periphery, and therefore, the gap between the leader tape and its periphery disappears.

Further, by providing a leader tape with a thickness compensation structure, a leader tape having a larger thickness compared with the recording tape can be employed. Therefore, the leader tape can be formed of a large variety of materials having different thickness considering strength required for a leader tape. In addition, when employing a leader tape having a thickness compensation structure, the recording tape is preferably connected to its surface facing outside when it is wrapped around the reel hub.

A magnetic tape employed as an external recording medium for a computer can be used as the recording tape of the claimed invention. The recording tape includes any tapes on which information can be recorded magnetically or optically and usable as a recording-reproducing medium.

A second aspect of this invention for achieving the above object is the recording tape cartridge of the first aspect, wherein the engagement of the leader tape has an engaging opening that fits to an fixing pin provided on a portion outside of the wind-up surface of the reel hub onto which the recording tape is wound.

In the recording tape cartridge of this aspect, the top end of the leader tape can be fixed to the periphery of the reel hub by engaging the engaging opening provided on the engagement engaging with the fixing pin.

Accordingly, neither a protrusion nor an opening is needed to be formed on the periphery of the reel hub, and therefore, no irregularity coming from the protrusion or the opening is formed on the wind-up surface.

In addition, the recording tape cartridge of this aspect is preferable in that the leader tape engages with the reel hub reliably and that once fixing to the reel hub, the leader tape won't remove from the reel hub even when no recording tape is taken up.

A third aspect of this invention for achieving the above object is the recording tape cartridge of the second aspect, wherein the recording tape is a magnetic tape.

The recording tape cartridge of this aspect does not cause any formation of a bump on a reel hub of a tape drive, which causes formation of a crease or a deformation on the recording tape. Therefore, there is no formation of an unrecorded area and generation of a loss of recorded information on the recording tape. Accordingly, the recording tape cartridge of this aspect is preferable for an external recording medium for a computer.

A fifth aspect of this invention for achieving the above object is the recording tape cartridge of the third aspect, wherein the engaging opening has a substantially rectangular shape and the fixing pin has a substantially rectangular section.

Fourth and the sixth aspects of this invention for achieving the above object are the recording tape cartridges of the third and fifth aspects, respectively, wherein the leader tape is formed of a material selected from a group consisting of aluminium, stainless steel, and a synthetic resin.

All of the materials included in the above group are non-magnetic, and therefore, the recording tape cartridge is preferable in that the leader tape does not become magnetic to destroy recorded information when the recording tape is a magnetic tape.

A seventh aspect of this invention for achieving the above object is the recording tape cartridge of the third aspect, wherein the leader tape has a length equal to the circumference of the reel hub.

An eighth aspect of this invention for achieving the above object is the recording tape cartridge of the third aspect, wherein the leader tape has a length enough to be wound two or more turns around the reel hub. One end of the leader tape meets with the other end when the leader tape is fit closely to the periphery of the reel hub. Therefore, the two ends do not overlap with each other and no bump is formed on the wind-up surface of the reel hub.

A ninth aspect of this invention for achieving the above object is the recording tape cartridge of the eighth aspect, wherein the leader tape is formed of a material selected from a group consisting of aluminium, stainless steel, and a synthetic resin.

All of the materials included in the above group are non-magnetic, and therefore, the recording tape cartridge is preferable in that the leader tape does not become magnetic to destroy recorded information when the recording tape is a magnetic tape.

A tenth aspect of this invention for achieving the above object is the recording tape cartridge of the eighth aspect, wherein the leader tape has a length an integral number of times longer than the circumference of the reel hub.

An eleventh aspect of this invention for achieving the above object is the recording tape cartridge of the tenth aspect, wherein the leader tape is formed of a material selected from a group consisting of aluminium, stainless steel, and a synthetic resin. One end of the leader tape meets with the other end when the leader tape is fit closely to the periphery of the reel hub. Therefore, these two ends do not overlap with each other and no gap is formed on the wind-up surface of the reel hub.

A twelfth aspect of this invention for achieving the above object is the recording tape cartridge of the first aspect, wherein the engagement formed on the leader tape has an interfitting piece that fits into the recess provided on the periphery of a reel hub of a tape drive, the interfitting piece being located outside of the wind-up surface of the reel hub on which the recording tape is wound around.

A thirteenth aspect of this invention for achieving the above object is the recording tape cartridge of the twelfth aspect, wherein the recording tape is a magnetic tape.

A fourteenth aspect of this invention for achieving the above object is the recording tape cartridge of the thirteenth aspect, wherein the leader tape is formed of a material selected from a group consisting of aluminium, stainless steel, and a synthetic resin.

The interfitting piece disposed on the leader tape engages with the recess formed on the periphery of the reel hub and the top end of the recording tape is fixed on the wind-up surface of the reel hub. The leader tape of this aspect has no engaging opening and therefore, does not break at the engagement when the reel hub is suddenly accelerated to initiate wind-up of the recording tape and a strong tension is applied to the leader tape.

A fifteenth aspect of this invention for achieving the above object is the recording tape cartridge of the thirteenth aspect, wherein the engagement has a base portion on which the interfitting piece is fixed, the base portion curving in a circular direction.

A sixteenth aspect of this invention for achieving the above object is the recording tape cartridge of the above aspect, wherein the leader tape is formed of a material selected from a group consisting of aluminium, stainless steel, and a synthetic resin. In this aspect, the interfitting piece and the base portion of the leader tape can be formed separately. Therefore, shapes and materials can be optimized for both the interfitting piece and the leader tape.

A seventeenth aspect of this invention for achieving the above object is the recording tape cartridge of the fifteenth aspect, wherein the surface of the interfitting piece set in the base portion has the same or smaller radius of curvature as the circumference of the reel hub in the longitudinal direction of the leader tape.

An eighteenth aspect of this invention for achieving the above object is the recording tape cartridge of the seventeenth aspect, wherein the interfitting piece is an elastic body.

A nineteenth aspect of this invention for achieving the above object is the recording tape cartridge of the seventeenth aspect, wherein the surface of the interfitting piece set in the base portion has a smaller radius of curvature than the reel hub in the longitudinal direction of the leader tape.

The leader tape of this aspect is kept curved in accordance with the curvature of the periphery of the reel hub by fixing the interfitting piece to the base portion. Therefore, when fitting the interfitting piece into the recess of the reel hub, the top end of the leader tape fits closely to the periphery of the reel hub.

A twentieth aspect of this invention for achieving the above object is the recording tape cartridge of the above aspect, wherein the leader tape is formed of a material selected from a group consisting of aluminium, stainless steel, and a synthetic resin.

A twenty-first aspect of this invention for achieving the above object is the recording tape cartridge of the thirteenth aspect, wherein the leader tape has a length equal to the circumference of the reel hub.

A twenty-second aspect of this invention for achieving the above object is the recording tape cartridge of the thirteenth aspect, wherein the leader tape has a length enough to be wound two or more turns around the reel hub.

A twenty-third aspect of this invention for achieving the above object is the recording tape cartridge of the twenty-second aspect, wherein the leader tape is formed of a material selected from a group consisting of aluminium, stainless steel, and a synthetic resin.

A tape drive to which the recording tape cartridge of the present invention can be loaded is described in the following. The tape drive comprises a wind-up reel having a reel hub that the recording tape accommodated in the recording tape cartridge is wound around, a drive system rotating the wind-up reel, a take-up device drawing the leader tape out of the recording tape and fixing the engagement of the leader tape to the wind-up reel, and a recording-reproducing device recording or reproducing information on the recording tape. The wind-up reel has an engagement portion with which the engagement of the leader tape is engaged and has a periphery that the leader tape fits closely while taking-up the recording tape.

When the recording tape cartridge is loaded to the above tape drive, the take-up device draws the leader tape out of the case of the cartridge and guides it to the wind-up reel. Then, the engagement of the leader tape is engaged with the engagement of the wind-up reel and the leader tape is fixed to the wind-up reel.

By rotating the wind-up reel, the leader tape fits closely to the periphery of the reel hub while warping in its thickness direction to form a wind-up surface on which the recording tape is wound up.

Since the engagement portion is provided outside of the reel hub, the leader tape engages with the wind-up reel out of the wind-up surface of the wind-up reel. Therefore, no bump having a height larger than the thickness of the leader tape is formed and neither any crease nor any deformation appears on the recording tape wound onto it. Accordingly, neither formation of unrecorded area nor loss of recorded information takes place.

The tape drive includes a tape drive to which a recording tape cartridge having a leader tape with an engagement having an engaging opening can be loaded. The engaging portion of the wind-up reel includes a fixing pin disposed on the wind-up reel outside of the reel hub and engaging with the engaging opening on the leader tape.

When loading the recording tape cartridge to the above tape drive, the engaging opening on the leader tape engages with the fixing pin of the wind-up reel and the top end of the leader tape is fixed to the periphery of the reel hub.

Therefore, the leader tape engages reliably with the reel hub and the removal of the leader tape from the reel hub can be avoided even when suddenly accelerating the wind-up reel to initiate winding-up of the recording tape.

The tape drive also includes a tape drive to which a recording tape cartridge having a leader tape with a interfitting piece on its engagement. When the tape cartridge is loaded to the tape drive, the interfitting piece of the leader tape engages with the recess on the periphery of the reel hub.

This type of the tape drive is favourable in that no breakage of the leader tape takes place even when accelerating the wind-up reel of the tape drive since the leader tape has no engaging opening on its engagement.

BRIEF DESCRIPTION OF THE DRAWINGS

FIGS. 2A and 2B show a structure of the leader tape of the recording tape cartridge shown in FIG. 1.

FIGS. 6A and 6B show a magnetic tape drawn out of the recording tape cartridge of FIG. 1 and wound onto the wind-up reel of FIG. 3.

FIGS. 8A and 8B show the wind-up reel of the tape drive with the magnetic tape of the recording tape cartridge reeled thereon.

DESCRIPTION OF THE EMBODIMENTS

First Embodiment

Recording tape cartridge 10 that is an embodiment of this invention is mentioned below.

Figure 1:
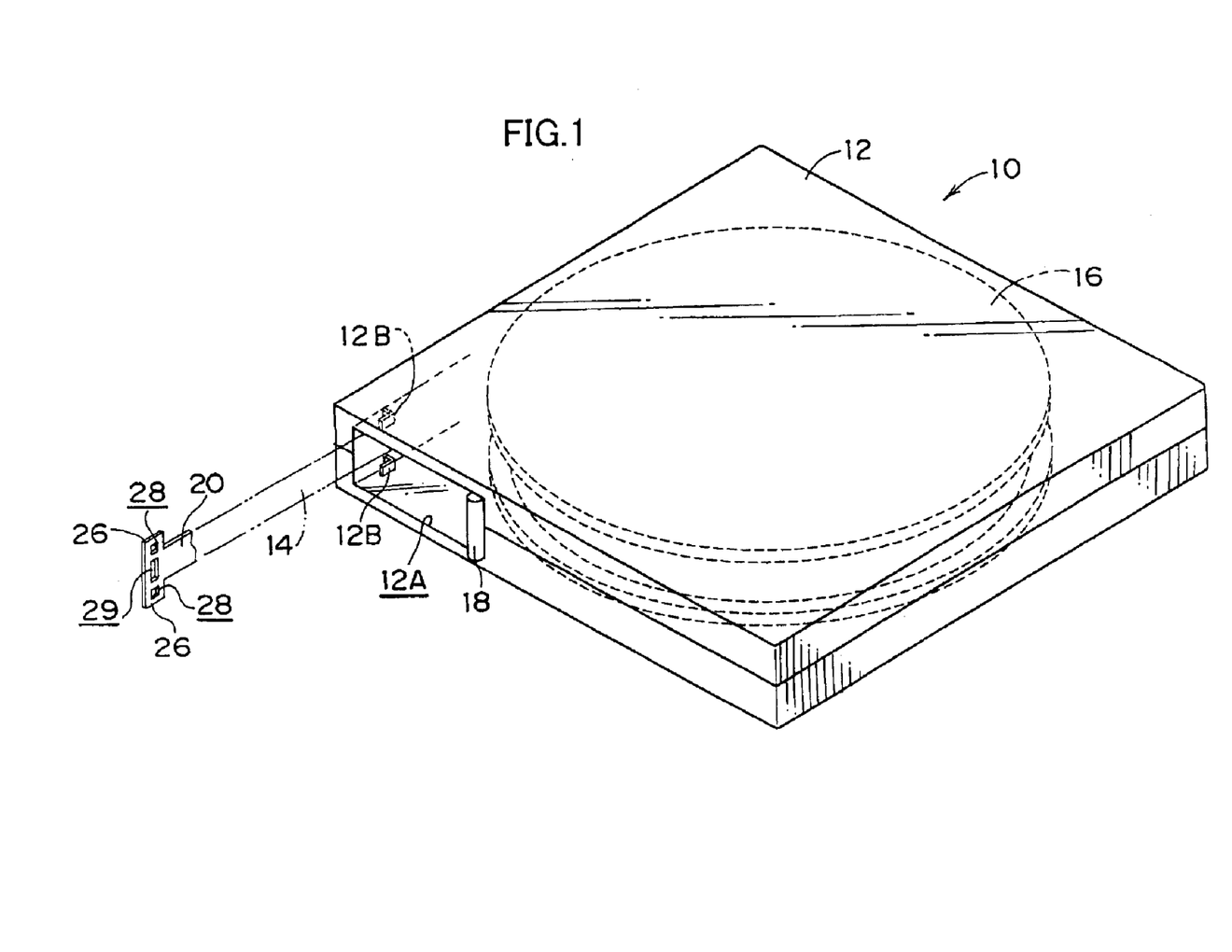
FIG. 1 shows a perspective view of the recording tape cartridge of a first embodiment.

As shown in FIG. 1, recording tape cartridge 10 has reel 16 that is a single reel, magnetic tape 14 that is an example of the recording tape of this invention and is wound around reel 16, case 12 that is a flat, rectangular case holding reel 16 rotatably.

There is provided an opening exposing a gear attached to reel 16 at the bottom of case 12. The gear engages with the driving gear of tape drive and the reel 16 rotates in case 12.

Opening 12A that is closed by sliding door 18 is also provided on case 12. Magnetic tape 14 is taken up from opening 12A.

Figure 2A:
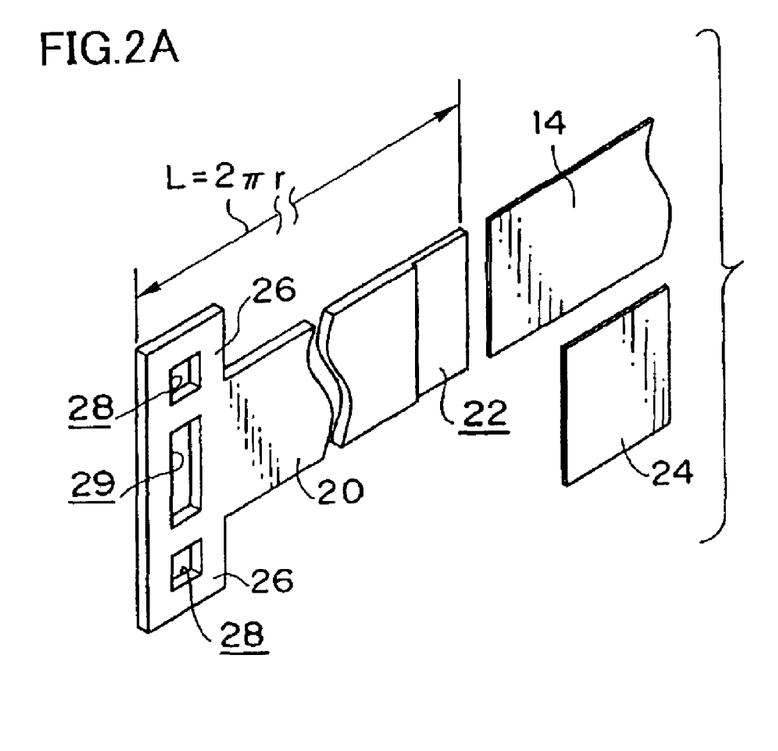
FIG. 2A is a perspective view showing a relative position of the leader tape and the magnetic tape of the recording tape cartridge before connecting to each other.
Figure 2B:
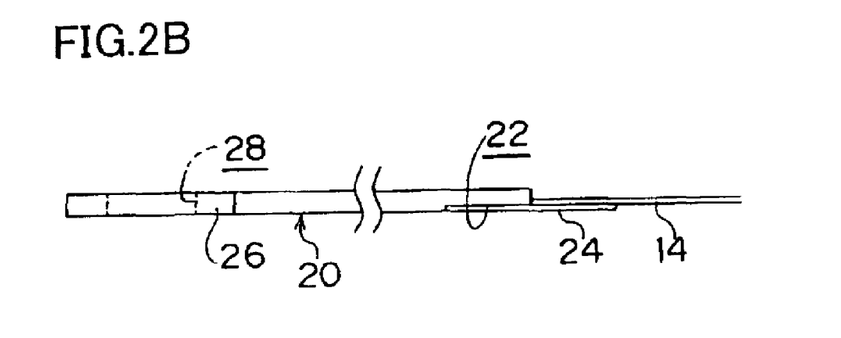
FIG. 2B is a plane view showing the connection of the leading tape to the magnetic tape.

As shown closely in FIGS. 2A and 2B, to the top end of magnetic tape 14, leader tape 20 having the same width is connected. Leader tape 20 is formed of a metal sheet such as an aluminium sheet or a stainless steel sheet to enforce the portion around engaging hole 28 (and wind-up opening 29). Therefore, leader tape 20 is formed flexible in its thickness direction. Since magnetic tape 14 is employed in recording tape cartridge 10, leader tape 20 is preferably formed of a non-magnetic material such as aluminium.

Leader tape 20 has a length correspondent to the circumference of reel hub 32 of a tape drive. In other words, when reel hub 32 has a radius of r, leader tape 20 has a length L of $2\pi r$.

Leader tape 20 has recess 22 at one end. Recess 22 is provided on the surface of leader tape 20 facing to outside when wrapped around reel hub 32. Recess 22 also extends to the whole width of leader tape 20. On recess 22, splicing tape 24 having the same width as magnetic tape 14 and leader tape 20 is stuck. Splicing tape 24 is also stuck on the top end of magnetic tape. Thus, magnetic tape 14 and leader tape 20 are connected to each other in alignment by splicing tape 24.

Recess 22 has the same depth as the thickness of splicing tape 24 (15 to 30 $\mu$m) and therefore, as shown in FIG. 2B, the outside surface of leader tape 20 is substantially in the same level as the surface of splicing tape 24. Magnetic tape 14 has a thickness of 6 to 20 $\mu$.

On the other end, in other words, the free end of leader tape 20 that is the end opposite to the end that magnetic tape 14 is connected to, a pair of engaging pieces 26 is disposed so that each of them protrudes from each of the edge of leader tape 20. At the central part of each of engaging pieces 26, engaging hole 28, which is an example of the engagement of this invention, is formed. Engaging hole 28 is an opening that is substantially 2 mm square.

Each of engaging pieces 26 are provided so as to engage with a pair of hooks 12B disposed just inside of the opening 12A of case 12. In the storage or transportation of recording tape cartridge 10, engaging piece 26 is fixed to hook 12B. On the other hand, as mentioned hereinafter, each of engaging holes 28 is provided so as to engage with fixing pin 40 disposed on wind-up reel 30.

Taking-up opening 29 is provided so that a take-up device of the tape drive can engage with it. When drawing magnetic tape 14 out of case 12, the take-up device hooks up (in other words, engages with) leading tape 20 at taking-up opening 29.

Figure 3:
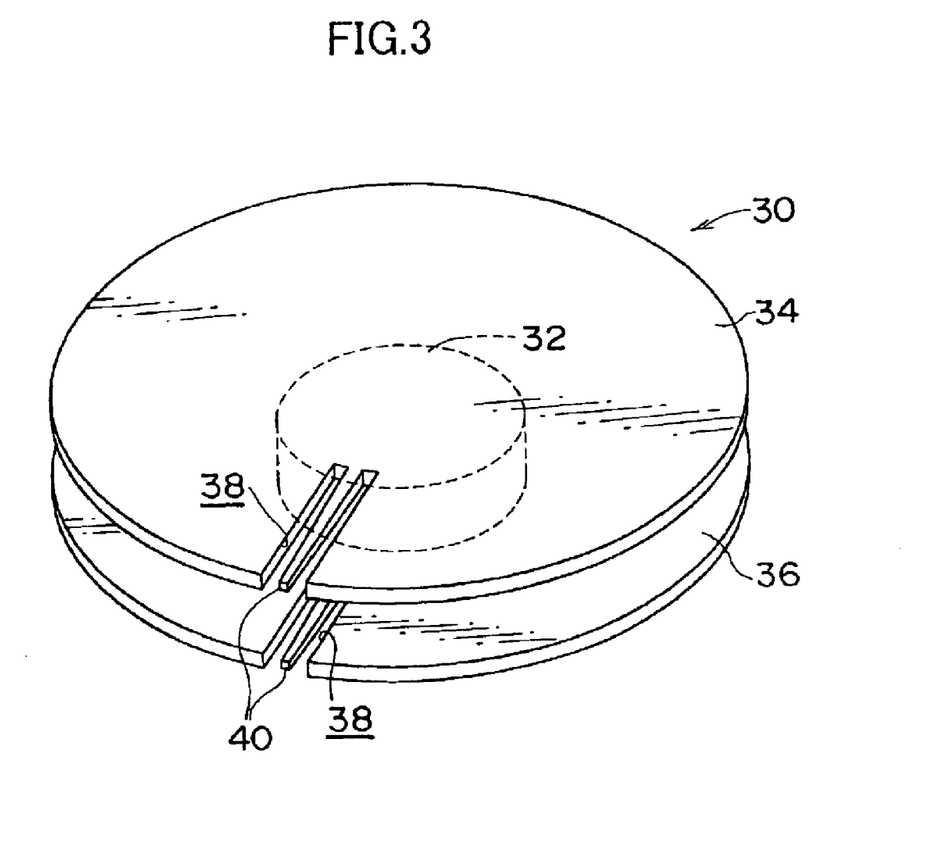
FIG. 3 is a perspective view showing the whole constitution of a wind-up reel of a tape drive onto which the magnetic tape of the recording tape cartridge shown in FIG. 1 is wound.

Wind-up reel 30 of the tape drive is described in the following. As shown in FIG. 3, wind-up reel 30 comprises a reel hub 32 having a cylindrical shape with a radius of r and a height that is slightly larger than the width of magnetic tape 14, upper flange 34 and lower flange 36, both of which are coaxially fixed on each of end surfaces of reel hub 32.

Figure 4:
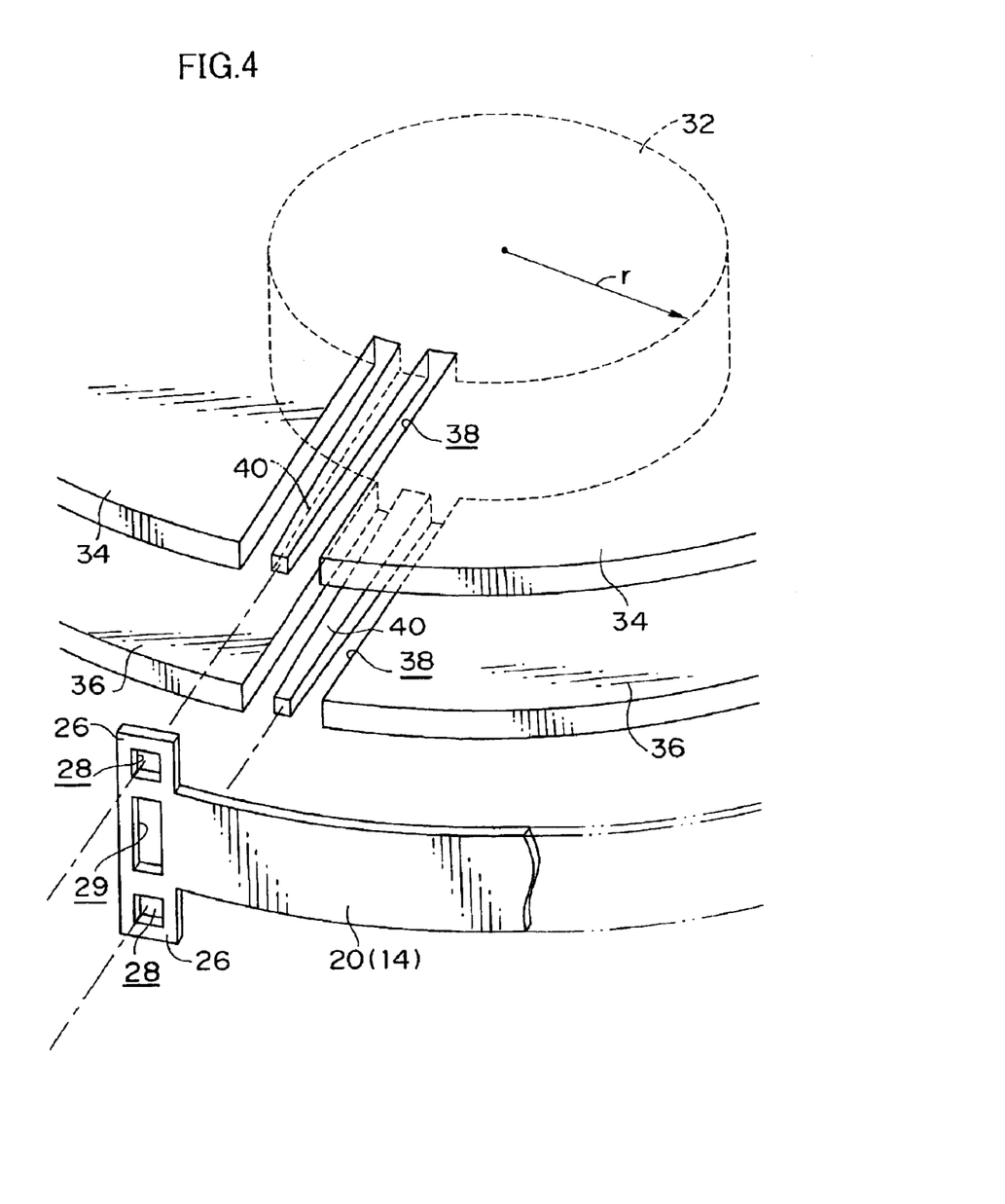
FIG. 4 is an enlarged perspective view of a principal part of the wind-up reel shown in FIG. 3.

As shown in FIG. 4, both of upper flange 34 and lower flange 36 have slits 38, respectively. Slits 38 extend from the peripheries of upper flange 34 and lower flange 36 to the periphery of reel hub 32. Each of slits 38 are provided so that engaging pieces 26 can go through them. Inside edge of each slit 38 is curved in accordance with the curvature of the periphery of reel hub 32. From the center of the inner edge of each slit 38, fixing pin 40 is extending in the longitudinal direction of slit 38, i.e., in the radial direction of wind-up reel 30. The point of each fixing pin 40 reaches at the opening of slits 38 at the peripheries of upper flange 34 and lower flange 36.

Figure 5:
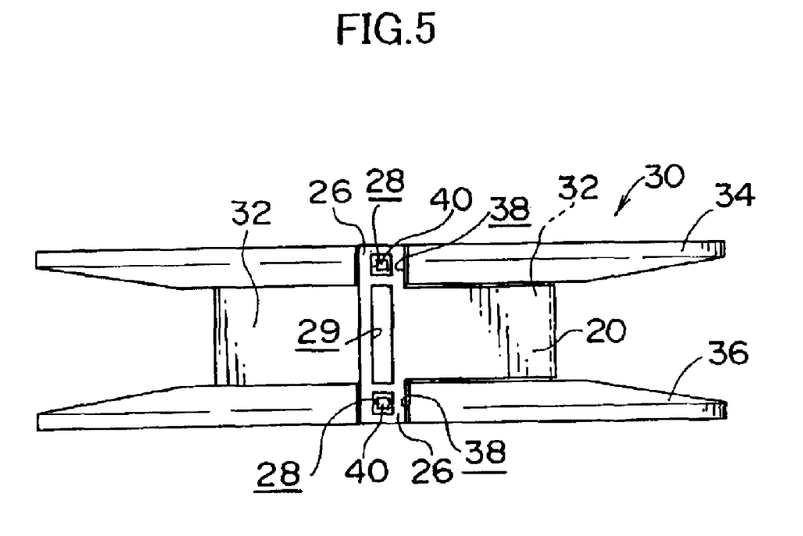
FIG. 5 is a front view showing the leader tape of the recording tape cartridge of FIG. 1 fixed to the wind-up reel shown in FIG. 3.

Each fixing pin 40 is tapered toward its point and formed so as to insert into engaging hole 28. As shown in FIG. 5, by inserting fixing pin 40 into engaging hole 28 to its base, leader tape 20 and magnetic tape 14 is fixed to reel hub 32 so that they are positioned perpendicularly to the axis of wind-up reel 30.

Fixing pin 40 can be formed to have a shorter length than slit 38 as long as it protrudes from the periphery of reel hub 32. However, it preferably has the same length as slit 38 as it functions as a guide guiding engaging piece 26 to its base.

When recording tape cartridge 10 is not used, in other words, in storage or in transportation, opening 12A is closed by sliding door 18 to preventing any dust from entering into case 12. Engaging pieces 26 are hooked on hook 12B of case 12.

To record information on magnetic tape 14 or reproduce recorded information therefrom, recording tape cartridge 10 is loaded to a tape drive. When loading recording tape cartridge 10 to the tape drive, sliding door 18 is moved to open opening 12A. Then, from opening 12A, the take-up device goes inside of case 12 to engage with wind-up opening 29. The take-up device takes leader tape 20 out of case 12.

The take-up device guides leader tape 20 to wind-up reel 30 and inserts each fixing pin 40 to each engaging opening 28. When fixing pins 40 are inserted into engaging holes 28 to its base, the take-up device is shunted so as not to interrupt the rotation of wind-up reel 30.

Figure 6A:
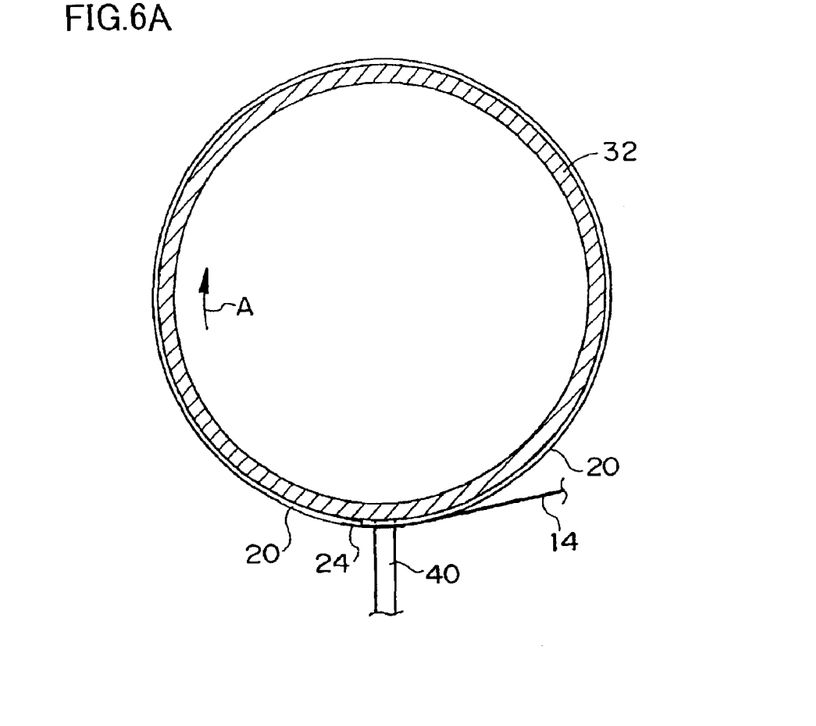
FIG. 6A is a sectional view sectioned along a plane perpendicular to the axis of the wind-up reel.

Then, wind-up reel 30 begins rotating in the direction of arrow A in FIG. 6A synchronous with reel 16. With wind-up reel 30 rotating, leader tape 20 warps in its thickness direction along the periphery of reel hub 32 and is wrapped around to contact closely to reel hub 32.

Figure 6B:
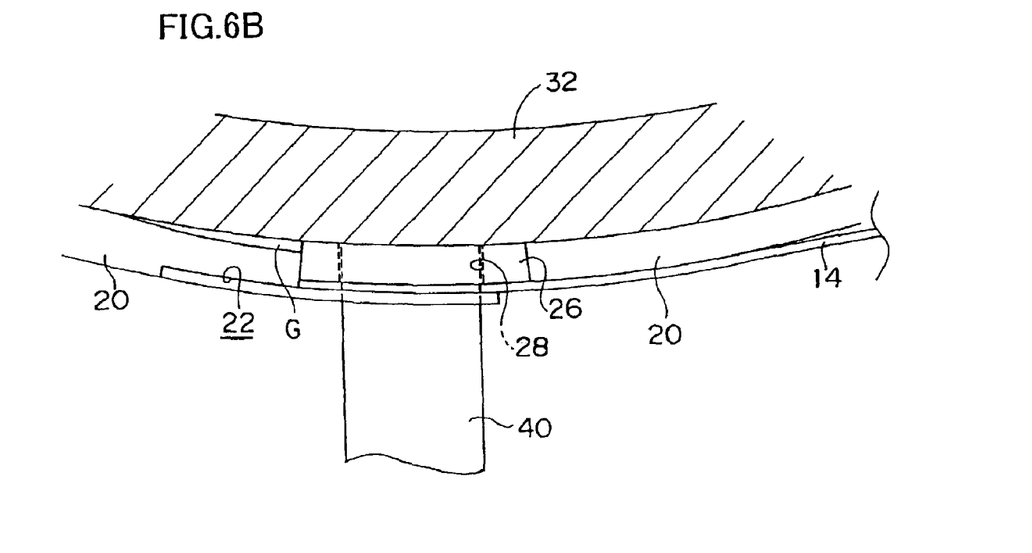
FIG. 6B shows the leader tape engaging with the wind-up reel.

As shown in FIG. 6A, leader tape 20 is wrapped in one turn around reel hub 32 to form a wind-up surface, on which magnetic tape 14 is taken up. As shown in FIG. 6B, there is formed a small gap G between the end of leader tape 20 that magnetic tape 14 is connected to and the periphery of reel hub 32. The height of gap G is the same or less than the addition of the thickness of magnetic tape 14 and the thickness of splicing tape 24.

Magnetic tape 14 is drawn out of case 12 while taken up on the above-mentioned wind-up surface formed on reel hub 32 and information are recorded or reproduced by a read-write head (a magnetic head) disposed beside a specific tape path.

Since leader tape 20 is formed of a film or a tape, its thickness can be precisely controlled, and therefore, the thickness of leader tape 20 varies little among different recording tape cartridges 10. In addition, the shape of warped leader tape 20 does not vary among different recording tape cartridges 10 since leader tape 20 warps in its thickness direction to contact closely to the periphery of reel hub 32 (the portion of the periphery without any recess or cut). Therefore, a good accuracy of positioning of magnetic tape 14 is accomplished.

Additionally, since leader tape 20 is fixed with reel hub 32 (fixing pins 40) at engaging holes 28 provided at its one end, there is no necessity of overlapping the end of leader tape 20 with a take-up leader of a tape drive. Therefore, there is no necessity of providing any protrusion or opening for engagement, which leads to unevenness on a wind-up surface (e.g., the inside portion of leader tape 20 and the periphery of reel hub 32).

Further, splicing tape 24 is stuck at a recess 22 having a depth corresponding to its thickness, and therefore, as mentioned in the above, only a bump having a height same as or less than the addition of the thickness of magnetic tape 14 and splicing tape 24 is formed.

Therefore, formation of a bump having a height larger than the thickness of leader tape 20 on the wind-up surface can be avoided. In addition, leader tape 20 has the same length as the circumference of reel hub 32, and accordingly, when wrapping leader tape 20 around reel hub 32, the free end of leader tape 20 meets with the other end connected to magnetic tape 14. Therefore, as shown in FIG. 6B, formation of a gap on the wind-up surface due to the thickness of leader tape 20 can be avoided.

As mentioned in the above, the bump formed when winding up magnetic tape 14 on the wind-up surface of reel hub 32 can be quite small. Definitely, in this embodiment, the thickness of the gap can be reduced as small as the thickness of splicing tape 24.

Further, since the thickness of leader tape 20 is absorbed, wider variety of materials having different thickness can be employed for leader tape 20. Leader tape 20 can have a length an integral number times longer than the circumference of reel hub 32, i.e., leader tape 20 can be formed so that its free end and the connection to magnetic tape 14 meet with each other. However, considering the dimensional accuracy and its cost, leader tape 20 preferably has a length of the circumference of reel hub 32 ($2\pi r$).

Hereinafter, Embodiments 2 and 3 are described. The description of the same components of these embodiments as those of the first embodiment is omitted hereinafter.

Second Embodiment

Figure 7:
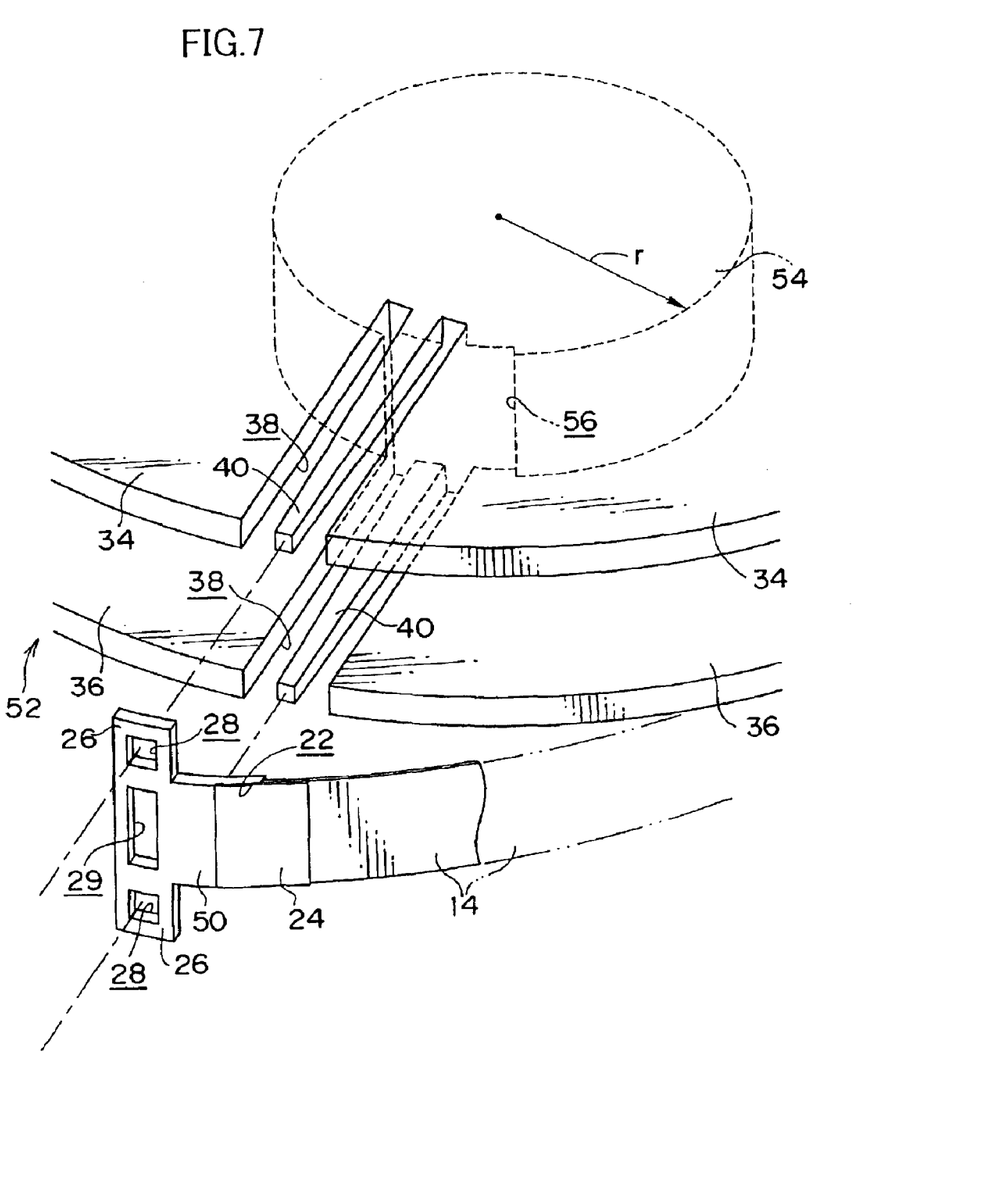
FIG. 7 is a perspective view of the leader tape of the recording tape cartridge of a second embodiment an information wind-up reel to which the leader tape fits.

FIG. 7 indicates a constitution of leader tape 50 of the second embodiment. As FIG. 7 shows, leader tape 50 is the same as leader tape 20 of the first embodiment in having recess 22, engaging pieces 26, engaging holes 28, and wind-up opening 29. However, it is different from leader tape 20 in that it is considerably shorter than the circumference (having a length of 2r) of reel hub 54 (having a radius r).

Like leader tape 20, leader tape 50 is connected to the top end of magnetic tape 14 by splicing tape 24. Leader tape 50 also has the same width, thickness and formed of the same material as leader tape 20. Leader tape 50 as well as leader tape 20 is formed flexible in its thickness direction. Engaging holes 28 are opened with a dimensional precision of ±0.2 mm.

While, wind-up reel 52 is different from wind-up reel 30 in having reel hub 54 instead of reel hub 32. Reel hub 54 has the same diameter and height as reel hub 32. However, reel hub 54 has recess 56 having a circular arc section coaxial thereto the full width. Recess 56 is also formed to have a depth corresponding to the thickness of leader tape 50. Therefore, leader tape 50 fits into recess 56 and contact closely to its bottom.

Each engaging pin 40 is based on the bottom of recess 56 and provided so that leader tape 50 fits into recess 56 when it is inserted into engaging hole 28 of leader tape 50 to its base. In other words, one of the edges of slit 38 extends from one of the ends of recess 56. The dimension from the end of recess 56 wherein the slit edge extends to engaging pin 40 is corresponding to the dimension of the free end of leading tape 50 to engaging hole 28. The base of slit 38 is a circular arc corresponding to the bottom of recess 56.

Figure 8A:
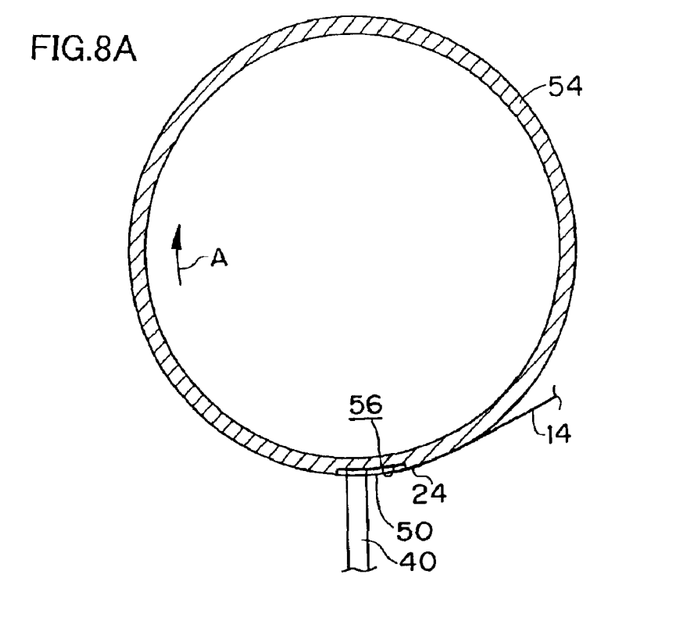
FIG. 8A shows a sectional view sectioned along a plane perpendicular to the axis of the wind-up reel.
Figure 8B:
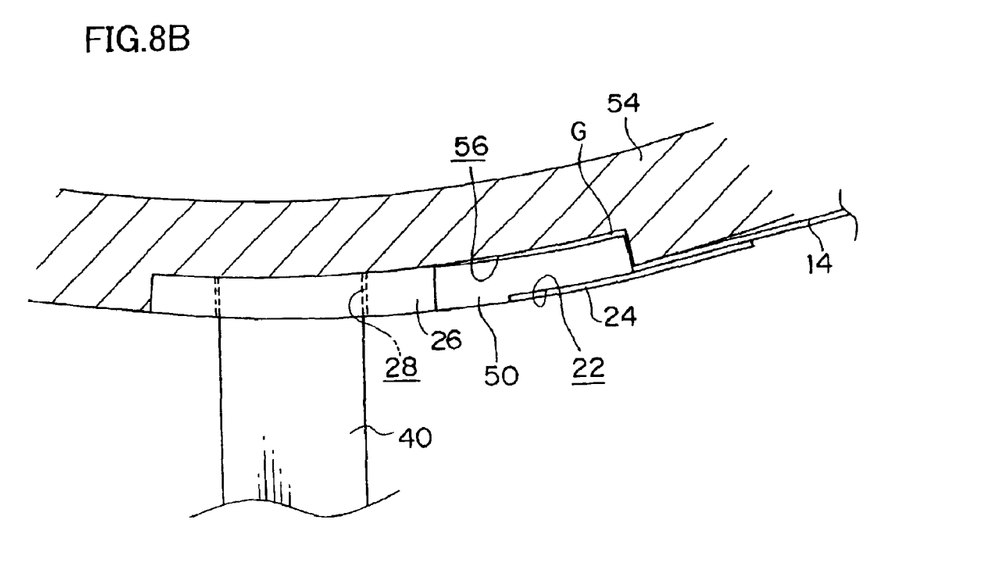
FIG. 8B shows the leader tape engaging with the wind-up reel.

In the second embodiment, when engaging pins 40 are inserted into engaging holes 28 of leader tape 50 to its base, the free end of leader tape 50 goes into recess 56. Then, wind-up reel 52 is rotated in the direction of arrow A in FIG. 8A while synchronizing with reel 16, and leader tape 50 goes into recess 56 and fits closely with warping in its thickness direction. After leader tape 50 fits in recess 56, as FIG. 8B shows, there is formed gap G of a vary (at highest, having the same height as the addition of the thickness of magnetic tape 14 and splicing tape 24) between the connection of leader tape 50 to magnetic tape 14 and the bottom of recess 56.

Thus, leader tape 50 forms on the periphery of reel hub 54 (except recess 56) a wind-up surface and magnetic tape 14 is taken up on it.

As described in the above, leader tape 50 fits into recess 56 and therefore, the thickness of leader tape 50 does not lead to formation of any gap on the wind-up surface. Additionally, leader tape 50 is formed tape-like or film-like and its thickness can be controlled precisely. Accordingly, the diversity of the thickness of leader tape 50 among different recording tape cartridge 10 is quite small. Further, leader tape 50 warps in its thickness direction in recess 56 to fit closely to the bottom of recess 56 (i.e. the periphery of reel hub 54). Therefore, there is no difference of the shape of warped leader tape among different recording tape cartridges 10 and good accuracy of positioning is obtained.

Since leader tape 20 is fixed to engaging pin 40 at engaging hole 28 formed at its end, there is no necessity of overlapping one end of leader tape 50 with a take-up leader of a tape drive. Therefore, there is no necessity of forming any opening or a protrusion on the wind-up surface (inside portion of leader tape 50 except engaging pieces 26 and the periphery of reel hub 32).

Leader tape 50 contacts to and removes from recess 56 in its thickness direction, in which direction leader tape 50 has a high dimensional precision (not having a constitution wherein leader tape 50 fits into recess 56 so that its longitudinal direction is perpendicular to the circumferential direction of reel hub 54). Therefore, the bump formed at the edge of recess 56 can be made smaller. In the second embodiment, the height of the gap can be reduced to the same height as the thickness of splicing tape 24 since splicing tape 24 is stuck in recess 22 having a depth corresponding to the thickness of splicing tape 24.

As described in the above, the recording tape cartridge of the second embodiment gives the same effect as that of the first embodiment. Additionally, the thickness of leading tape 50 does not lead to the formation of a high bump and therefore, leader tape 50 can be formed of a material of different thickness and its material cam be chosen considering its required strength.

Third Embodiment

Figure 9:
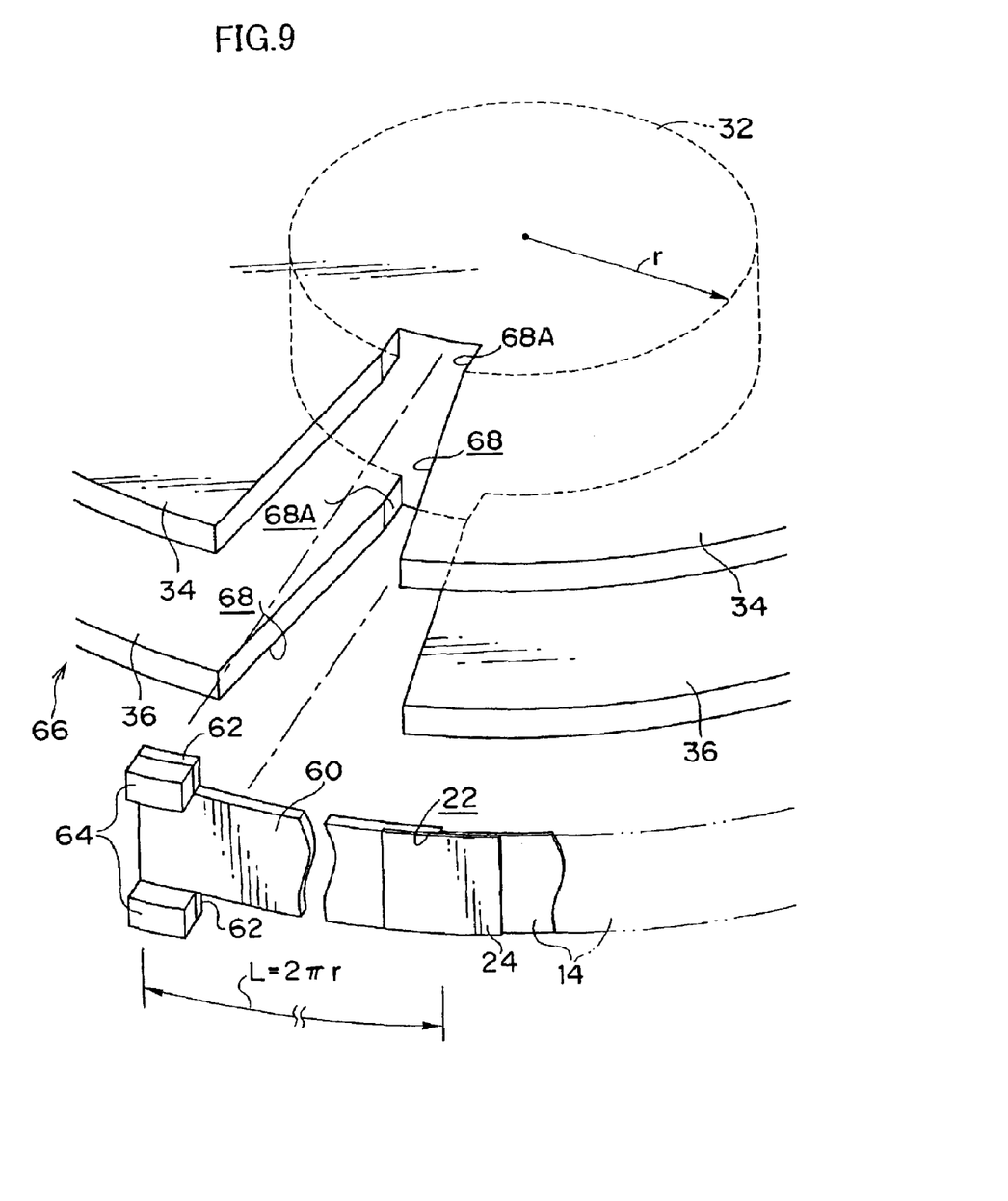
FIG. 9 is a perspective view of the leader tape of the recording tape cartridge of a third embodiment and the wind-up reel to which the leader tape fits.

As FIG. 9 shows, leader tape of the recording tape cartridge of the third embodiment is the same as leader tape 20 in having recess 22 and wind-up opening 29 and being connected to the top end of magnetic tape 14. Further, leader tape 60 has the same length, width and thickness and is formed of the same material as that of leader tape 20. Leader tape 60 is also formed flexible in its thickness direction.

Leader tape 60 is different from leader tape 20 in that it has a pair of base portions 62 in place of engaging pieces 26 having engaging holes 28. Each base portion 62 is extended from both edges of leader tape 60 and is 2 to 3 mm in length and 1 mm in width. On the surface of each base portion 62 facing outward when leader tape 60 is wound onto wind-up reel 66, interfitting pieces 64 are fixed by bonding or other.

Figure 10:
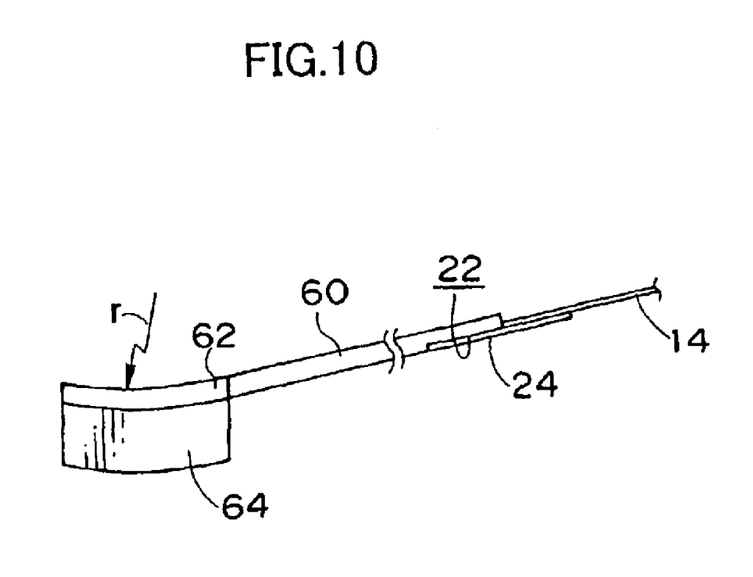
FIG. 10 is a plane view of the leader tape shown in FIG. 9.

Each of interfitting pieces 64 is formed in a small block and has a longitudinal and cross dimensions corresponding to those of base portion 62 and a thickness of 1 mm. Further, as FIG. 10 shows, interfitting piece 64 has a curved surface on which bonded to base portion 62. The curved surface of interfitting piece 64 curves the free end of leader tape 60 in a curvature corresponding to the periphery of reel hub 32.

Additionally, interfitting piece 64 can be formed of a material having a high rigidity such as an engineering plastic. Interfitting piece 64 also can be formed of an elastic material such as an elastomer or a plastic so that the free end of leader tape 60 can be warped in accordance with the curvature of the periphery of reel hub 32. When employing an elastomer or a plastic for the material of interfitting piece 64, it is preferably formed so that its surface on which base portion 62 is bonded has a curvature a little smaller than that of the periphery of reel hub 32.

Further, wind-up reel 66 is also different from wind-up reel 30 in having a pair of slits 68 having no engaging pins 40 in place of slits 38 of the second embodiment.

Each slit 68 extends from the peripheries of upper flange 34 and lower flange 36 toward the periphery of reel hub 32 in a radial direction, and tapers in a direction to the reel hub 32. Inner edge of each slit 38 curves correspondingly to the curvature of the periphery of reel hub. Slit 68 also has a straight portion 68A adjacent to the inner edge, with which interfitting piece 64 of leader tape 60 can engage. Leader tape 60 is provided so that when interfitting pieces 64 fits each slits 68, the free end of leader tape 60 contacts closely to the periphery of reel hub 32.

When recording tape cartridge of the third embodiment is loaded to the tape drive, a take-up device of the tape drive hooks the free end of leader tape 60 at wind-up opening 29 and guides it toward wind-up reel 66. Then, the take-up device engages each interfitting piece 64 with straight portions 68A of slits 68. Thus, leader tape 60 fits closely to the periphery of reel hub 32 at the portion where base portion 62 is provided.

With leader tape 60 engaging with reel hub 32, wind-up reel 66 and reel 16 are rotated synchronously, and the leader tape 60 is wrapped around reel hub 32 with warping in its thickness direction to form a wind-up surface as leading tape 20 does.

Leader tape 60 has an excellent dimensional accuracy and an excellent precision of positioning to engage with reel hub 32. In addition, there is no need to provide any engagement openings or protrusions on its wind-up surface on reel hub 32 since interfitting pieces 64 are located outside of the wind-up surface. Further, the thickness of leader tape 60 does not lead to the formation of a gap on the wind-up surface since leader tape 60 has the same length as the circumference of reel hub 32.

Figure 11:
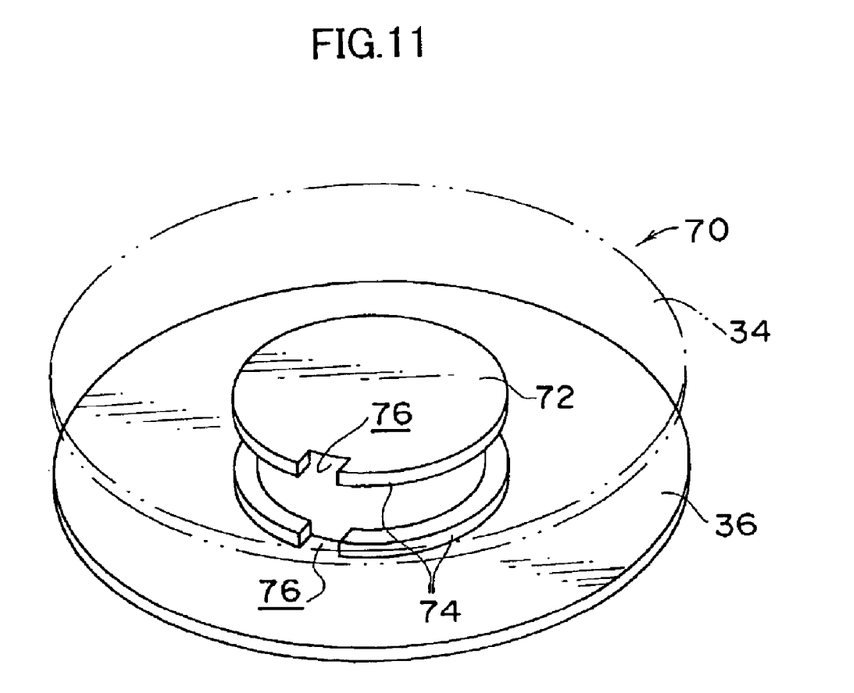
FIG. 11 is a perspective view of another example of a wind-up reel on which the leader tape of the recording tape cartridge of the third embodiment.

In the third embodiment, wind-up reel 70 can be used in place of wind-up reel 66. Wind-up reel 70 has reel hub 72, which has a radius of r and comprises a pair of circular protrusion 74 at each of its upper and lower end faces facing to the inside surfaces of upper flange 34 and lower flange 36. The distance between the two circular protrusions 74 substantially corresponds to the width of magnetic tape 14.

Each circular protrusion 74 has a cut 76. Cuts 76 provided at the upper circular protrusion 74 and lower circular protrusion 74 face to each other. Each cut 76 has its inner edge reaching to the periphery of reel hub 72 and is formed along its periphery. Each cut 76 is also formed so that engaging piece 64 can engage with it. The free end of leader tape 60 (wherein base portion 62 is provided) fits closely to the periphery of reel hub 32 when engaging piece 64 with cut 76.

In wind-up reel 70, there is no necessity of providing on upper flange 34 and lower flange 36 slit 68 or a groove that is a path guiding each interfitting piece 64 to a fixing position (cut 76) on reel hub 72.

This invention is not limited in the embodiments mentioned in the above and includes an embodiment wherein shown elements are combined fittingly. Therefore, in leader tape 50, base portions 62 and interfitting pieces 64 can be disposed in place of engaging pieces 26 and engaging hole 28 so that leader tape 50 can be applied to wind-up reel 66 having recess 56. In this embodiment of leader tape 50, leader tape 50 can be formed of an elastic material and have the same length as base portions 62.

Although leader tapes 20, 50, and 60 are formed of metals such as aluminium or a stainless steel, this invention is not limited in these embodiments. Therefore, leader tapes 20, 50, and 60 can be formed of a plastic. When forming leader tapes 20, 50, and 60 of a plastic, it is recommendable to dispose a reinforcing member around engaging holes 28 on engaging pieces 26 thereof. Additionally, it is not to be mentioned that the shapes, dimensions, and dimensional accuracy of leader tapes 20, 50, and 60 are not limited in those described in the above.

Further, in the above embodiments, leader tapes 20, 50, and 60 have a constitution wherein magnetic tape 14 is connected to them by splicing tape 24 stuck on recess 22. Leader tapes 20, 50, and 60 can be connected to magnetic tape 14 by ultrasonic welding, heat sealing, or bonding.

Additionally, although above embodiments have a constitution so that a take-up device of a tape drive engages with wind-up opening 29 to draw out leader tapes 20, 50, and 60, free ends of leader tapes 20, 50, and 60 can be cramped by a cramp of a take-up device and guided and engaged. Interfitting pieces 64 can also be taken up by the take-up device.

In addition, in the above embodiments, magnetic tape 14 is employed as the recording tape. However, this invention is not limited in the above embodiments and the recording tape includes any tape-like information-recording-reproducing media on which information can be recorded and reproduced. It is not to be mentioned that the gist of this invention can be applied to any recording tape cartridges of different information recording-reproducing methods.

What is claimed is:

1. A recording tape cartridge in combination with a tape drive comprising:
   a case;
   a recording tape, which is wound around a single rotatable reel contained in the case and wound onto a reel hub of the tape drive, for recording information thereto or playing information back therefrom;
   a leader tape having a tape shaped form and having a flexibility in its thickness direction, and being connected at one end of said leader tape to the top end of the recording tape;
   wherein said leader tape has engagements attachable to the reel hub formed at the other leader tape end which is not connected to the recording tape, said engagements being positioned on the outer edges of the leader tape, and fitting closely on the periphery of the reel hub with the engagements engaging with the reel hub when the recording tape is wound onto the reel hub, and wherein the engagement of the leader tape has an engaging opening that receives a fixing pin provided on a portion of the reel hub outside of the wind-up surface of the reel hub onto which the recording tape is wound.

2. The recording tape cartridge and tape drive of claim 1, wherein the recording tape is a magnetic tape.

3. The recording tape cartridge and tape drive of claim 2, wherein the leader tape is formed of a material selected from a group consisting of aluminum, stainless steel, and a synthetic resin.

4. The cartridge and tape drive of claim 2, wherein the engaging opening has a substantially rectangular shape and the fixing pin has a substantially rectangular section.

5. The recording tape cartridge and tape drive of claim 4, wherein the leader tape is formed of a material selected from a group consisting of aluminum, stainless steel, and a synthetic resin.

6. The recording tape cartridge and tape drive of claim 2, wherein the leader tape has a length equal to the circumference of the reel hub.

7. The recording tape cartridge and tape drive of claim 2, wherein the leader tape is long enough to be wound two or more turns around the reel hub.

8. The recording tare cartridge and tape drive of claim 7, wherein the leader tape is formed of a material selected from a group consisting of aluminum, stainless steel, and a synthetic resin.

9. The recording tape cartridge and tape drive of claim 7, wherein the leader tape has a length an integral number of times longer than the circumference of the reel hub.

10. The recording tape cartridge and tape drive of claim 9, wherein the leader tape is formed of a material selected from a group consisting of aluminum, stainless steel, and a synthetic resin.

11. The recording tape cartridge and tare drive of claim 1, wherein the engagement formed on the leader tape has an interfitting piece and wherein the reel hub includes a recess in a wind-up surface upon which the leader tape is wound, said interfitting piece being received in the recess and being located outside of the wind-up surface of the reel hub on which the recording tape is wound around.

12. The recording tape cartridge and tape drive of claim 11, wherein the recording tape is a magnetic tape.

13. The recording tape cartridge and tape drive of claim 12, wherein the leader tape is formed of a material selected from a group consisting of aluminum, stainless steel, and a synthetic resin.

14. The recording tape cartridge and tape drive of claim 12, wherein the engagement has a base portion on which the interfitting piece is fixed, the base portion curving in a circular direction.

15. The recording tape cartridge and tape drive of claim 14, wherein the leader tape is formed of a material selected from a group consisting of aluminum, stainless steel, and a synthetic resin.

16. The recording tape cartridge and tape drive of claim 14, wherein the surface of the interfitting piece set in the base portion has the same or smaller radius of curvature as the circumference of the reel hub in the longitudinal direction of the leader tape.

17. The recording tare cartridge and tape drive of claim 16, wherein the interfitting piece is an elastic body.

18. The recording tape cartridge and tape drive of claim 16, wherein the surface of the interfitting piece set in the base portion has a smaller radius of curvature than the outer periphery of the reel hub in the longitudinal direction of the leader tape.

19. The recording tape cartridge and tape drive of claim 18, wherein the leader tape is formed of a material selected from a group consisting of aluminum, stainless steel, and a synthetic resin.

20. The recording tare cartridge and tape drive of claim 12, wherein the leader tape has a length equal to the circumference of the reel hub.

21. The recording tape cartridge and tape drive of claim 12, wherein the leader tape has a length enough to be wound two or more turns around the reel hub.

22. The recording tape cartridge and tape drive of claim 21, wherein the leader tape is formed of a material selected from a group consisting of aluminum, stainless steel, and a synthetic resin.

23. A recording tape cartridge in combination with a tape drive comprising:

a case;

a recording tape, which is wound around a single rotatable reel contained in the case and wound onto a reel hub of the tape drive, for recording information thereto or playing information back therefrom; and a leader tape having a tape shaped form and having a flexibility in its thickness direction, and being connected at one end of said leader tape to the top end of the recording tape;

wherein said leader tape has engagements attachable to the reel hub formed at the other leader tape end which is not connected to the recording tape, said engagements being positioned on the outer edges of the leader tape, and fitting closely on the periphery of the reel hub with the engagements engaging with the reel hub when the recording tape is wound onto the reel hub, and wherein the engagement formed on the leader tape has an interfitting piece and the reel hub includes a recess m a wind-up surface upon which the leader tape is wound, said interfitting piece being received in the recess and being located outside of the wind-up surface of the reel hub on which the recording tape is wound around.

* * * * *